(12) United States Patent
Nishimura et al.

(10) Patent No.: US 9,158,071 B2
(45) Date of Patent: Oct. 13, 2015

(54) OPTICAL PATH-CHANGING MEMBER

(71) Applicant: FUJIKURA LTD., Koto-ku, Tokyo (JP)

(72) Inventors: Akito Nishimura, Sakura (JP); Shota Numata, Sakura (JP)

(73) Assignee: FUJIKURA LTD., Tokyo (JP)

( * ) Notice: Subject to any disclaimer, the term of this patent is extended or adjusted under 35 U.S.C. 154(b) by 298 days.

(21) Appl. No.: 13/855,403

(22) Filed: Apr. 2, 2013

(65) Prior Publication Data

US 2013/0266262 A1    Oct. 10, 2013

(30) Foreign Application Priority Data

Apr. 9, 2012 (JP) .................................. 2012-088861
Feb. 27, 2013 (JP) .................................. 2013-037952

(51) Int. Cl.
  *G02B 6/32* (2006.01)
  *G02B 6/42* (2006.01)
(52) U.S. Cl.
  CPC .............. *G02B 6/32* (2013.01); *G02B 6/4214* (2013.01); *G02B 6/423* (2013.01); *G02B 6/4239* (2013.01); *G02B 6/4244* (2013.01); *G02B 6/4249* (2013.01)
(58) Field of Classification Search
  CPC .................................................. G02B 6/4214
  See application file for complete search history.

(56) References Cited

U.S. PATENT DOCUMENTS

| 6,491,447 | B2 * | 12/2002 | Aihara .............................. 385/92 |
| 2009/0252455 | A1 | 10/2009 | Ohta et al. |
| 2011/0064358 | A1 * | 3/2011 | Nishimura ...................... 385/33 |

FOREIGN PATENT DOCUMENTS

| JP | 2001-51162 A | 2/2001 |
| JP | 2004-212847 A | 7/2004 |
| JP | 2006-184782 A | 7/2006 |
| JP | 2007-121973 A | 5/2007 |
| JP | 2009-104096 A | 5/2009 |
| JP | 2009-258510 A | 11/2009 |
| JP | 2011-59484 A | 3/2011 |

OTHER PUBLICATIONS

Communication dated Oct. 7, 2014 from the Japanese Patent Office in counterpart application No. 2013-037952.
Communication dated Dec. 16, 2014 from the Japanese Patent Office in counterpart Application No. 2013-037952.

* cited by examiner

*Primary Examiner* — Tina Wong
*Assistant Examiner* — Chad Smith
(74) *Attorney, Agent, or Firm* — Sughrue Mion, PLLC (57) ABSTRACT

An optical path-changing member comprises a member main body which is made of a transparent material and in which a reflection section optically connecting the optical fiber to the light input and output end is formed, wherein the reflection section is a first lens having a concave shape when viewed from an incident direction and making light incident on the inside of the member main body from one of the optical fiber and the light input and output end be internally reflected in the member main body and directed to the other of the optical fiber and the light input and output end, a second lens having a convex shape toward the optical component is formed in a light incidence and emission surface of the member main body, that faces the optical component.

4 Claims, 8 Drawing Sheets

OPTICAL PATH-CHANGING MEMBER

CROSS REFERENCE TO RELATED APPLICATIONS

Priority is claimed on Japanese Patent Application No. 2012-088861, filed on Apr. 9, 2012, and Japanese Patent Application No. 2013-037952, filed on Feb. 27, 2013, the contents of which are incorporated herein by reference.

BACKGROUND OF THE INVENTION

1. Field of the Invention

The present invention relates to an optical path-changing member that is provided at a terminal of an optical transmission body such as an optical fiber. An optical path-changing member is an optical component for changing a direction of an optical path between an optical fiber and a light input and output end provided at a substrate, thereby optically connecting the optical fiber and the light input and output end.

2. Description of Related Art

In recent years, a method to fix an optical connector assembled to a leading end portion of an optical fiber wired along a substrate on which an optical element such as a light-emitting element such as a surface emission type laser diode (Vertical Cavity Surface Emitting Laser, hereinafter referred to as a VCSEL) or a light-receiving element such as a photodiode (PD), in which light is vertically emitted or incident with respect to the substrate, is mounted, to the substrate so as to be optically connected to the optical element has been widely used.

In this type of optical connector, a structure to change an optical path in order to optically connect the optical fiber and the optical element is provided. As a typical optical connector having this structure, a PT optical connector (standardized by JPCA-PE03-01-06S) which changes an optical axis by 90° in the inside of the connector has been put to practical use.

The PT optical connector is a substrate mounting type optical connector that optically connects a multi-core optical fiber such as a multi-core optical fiber ribbon and an optical element on a flexible wiring substrate, and is beginning to be used in optical interconnection of routers, servers, parallel computers, or the like.

As an optical path-changing member that changes a direction of an optical path of a multi-core optical fiber, there is an optical path-changing member described in Japanese Unexamined Patent Application, First Publication No. 2006-184782. This optical path-changing member has a function to change an optical path of a two-dimensionally arranged multi-core optical fiber and has a structure to prevent occurrence of a large optical path difference by inclining a multi-core optical fiber of an upper stage with respect to a multi-core optical fiber of a lower stage, thereby bringing leading ends of the multi-core optical fibers of the upper and lower stages close to each other. Light emitted from the optical fiber or the optical element is of an external reflection type in which the light is incident on a reflection surface from the outside of an optical path-changing member main body.

As the optical element that is connected to the multi-core optical fiber, an optical module is used. The optical module is an optical component with a multi-channel light-emitting and light-receiving element and a transceiver circuit built therein.

In Japanese Unexamined Patent Application, First Publication No. 2007-121973, as an optical path-changing member, an internal reflection type PT optical connector is disclosed in which light is incident on a reflection surface from the inside by way of an optical path-changing member main body. A lens is formed on the lower surface of the optical path-changing member, and light emitted from a leading end portion of an optical fiber is totally reflected to the circuit board side by a reflection surface and then condensed by the lens, thereby being optically coupled to a light input and output end on the circuit board side. Further, in a case where an optical element on the circuit board side is a light-emitting element, light emitted from the light-emitting element is condensed by the lens and then totally reflected by the reflection surface, thereby being optically coupled to the leading end portion of the optical fiber.

In the above-described optical path-changing members, since the reflection surface has the form of a flat slope, there is a problem in that it is difficult to change an optical path of incident light to an optimum direction. If the reflection surface has the form of a flat slope, there is a case where a shift occurs in a direction of incident light or a case where an optical connection cannot be maintained.

SUMMARY OF THE INVENTION

The present invention has been made in consideration of such circumstances and an object thereof is to provide an optical path-changing member which makes it possible for a change of an optical path in a reflection surface to be correctly performed.

According to an aspect of the present invention, an optical path-changing member is provided at a terminal of an optical fiber and installed at a position facing an optical component in which a light input and output end is provided having an optical axis inclined with respect to a direction of an optical axis of the terminal, the optical path-changing member including: a member main body which is made of a transparent material and in which a reflection section optically connecting the optical fiber to the light input and output end is formed, wherein the reflection section is a first lens having a concave shape when viewed from an incident direction and making light incident on the inside of the member main body from one of the optical fiber and the light input and output end be internally reflected in the member main body and directed to the other of the optical fiber and the light input and output end, a second lens having a convex shape toward the optical component is formed in a light incidence and emission surface of the member main body, that faces the optical component, the first lens is an aspheric lens that can make the light from the optical fiber become parallel through internal reflection and make the light be directed to the second lens or can condense light from the light input and output end and make the light be directed to the optical fiber, and the second lens is a spherical lens that can condense light from the first lens and make the light be directed to the light input and output end or can make light from the light input and output end parallel and make the light be directed to the first lens.

It is preferable that the optical fiber be a multi-core optical fiber arranged in two or more stages, an optical fiber insertion hole row in which a plurality of optical fiber insertion holes for inserting the optical fibers therein is arranged be formed in two or more stages in the member main body, the first lenses of two or more stages be provided in lines at positions on extended lines of the optical fiber insertion hole rows, and the second lenses of two or more stages be provided in lines at positions corresponding to the first lenses.

It is preferable that the first lens of a first stage among the first lenses formed in the two or more stages have a smaller distance from the optical fiber than in the first lens of a second stage and can make light from the optical fiber be directed to the second lens as parallel light having a small diameter in contrast with the first lens of the second stage.

It is preferable that the second lens be formed on a bottom surface of a concaved protective portion formed in the light incidence and emission surface and the protrusion height of the second lens be made smaller than the depth of the concaved protective portion.

It is preferable that in the member main body, a leading end disposition concave portion in which a leading end of the optical fiber is disposed be formed in the opposite surface to the light incidence and emission surface and that the leading end disposition concave portion be filled with an adhesive that fixes the leading end of the optical fiber to the member main body.

It is preferable that the reflection section be at least a portion of an inner surface of a reflection section formation concave portion formed in the opposite surface to the light incidence and emission surface of the member main body and be formed to be inclined with respect to directions of optical axes of the optical fiber and the light input and output end.

According to the present invention, since the first lens and the second lens are formed in the light incidence and emission surface, even in a case where a shift occurs in a direction of incident light, a direction of an optical path can be maintained in a desired direction by the two lenses.

Further, since both the first lens and the second lens are formed in the member main body, the relative positions of the two lenses do not change, and therefore, a highly accurate optical path change is possible.

DETAILED DESCRIPTION OF THE INVENTION

First Embodiment

Hereinafter, a first embodiment of the present invention will be described in detail based on the drawings.

Figure 1:
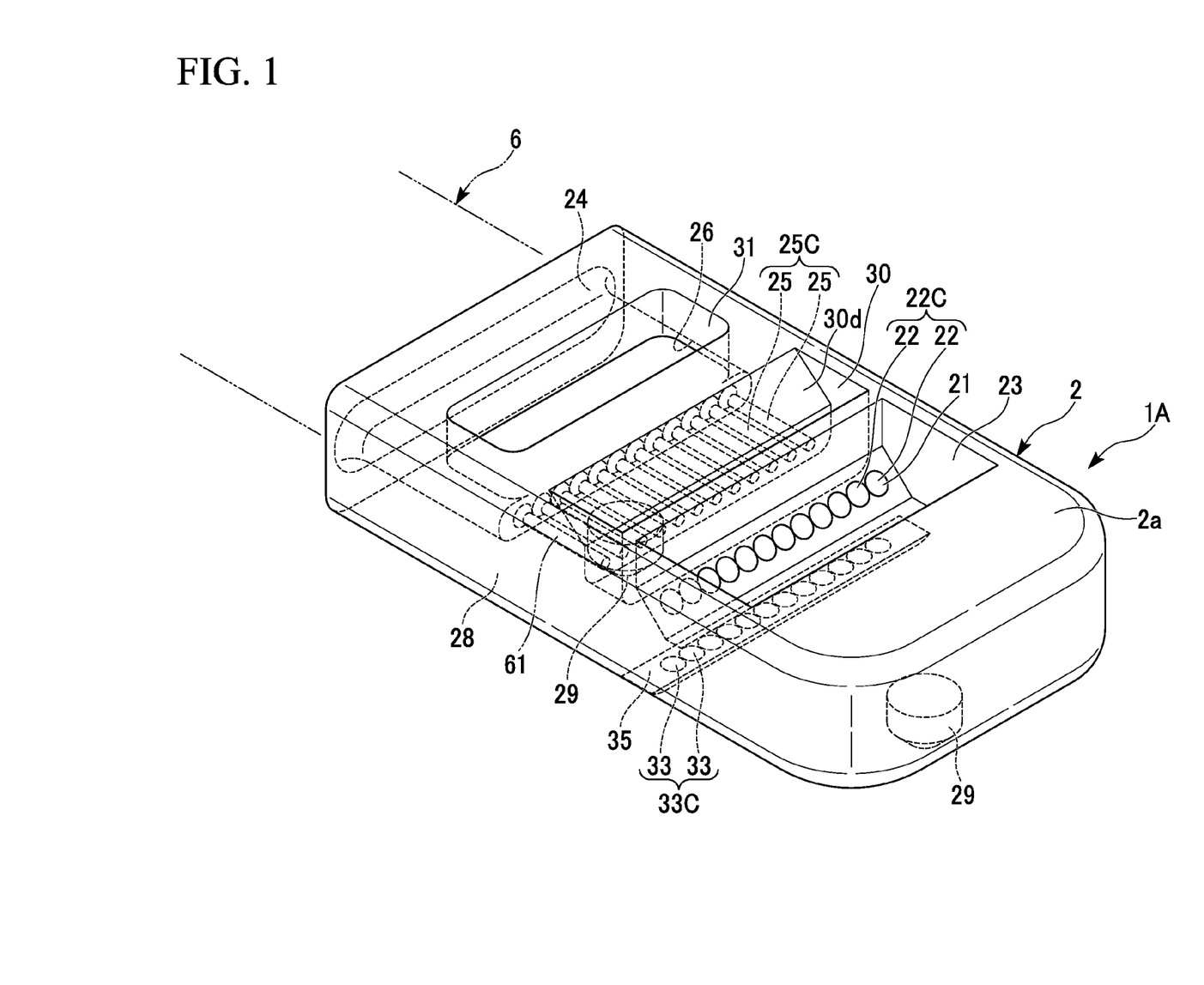
FIG. 1 is a perspective view of an optical path-changing member of a first embodiment related to the present invention.
Figure 2:
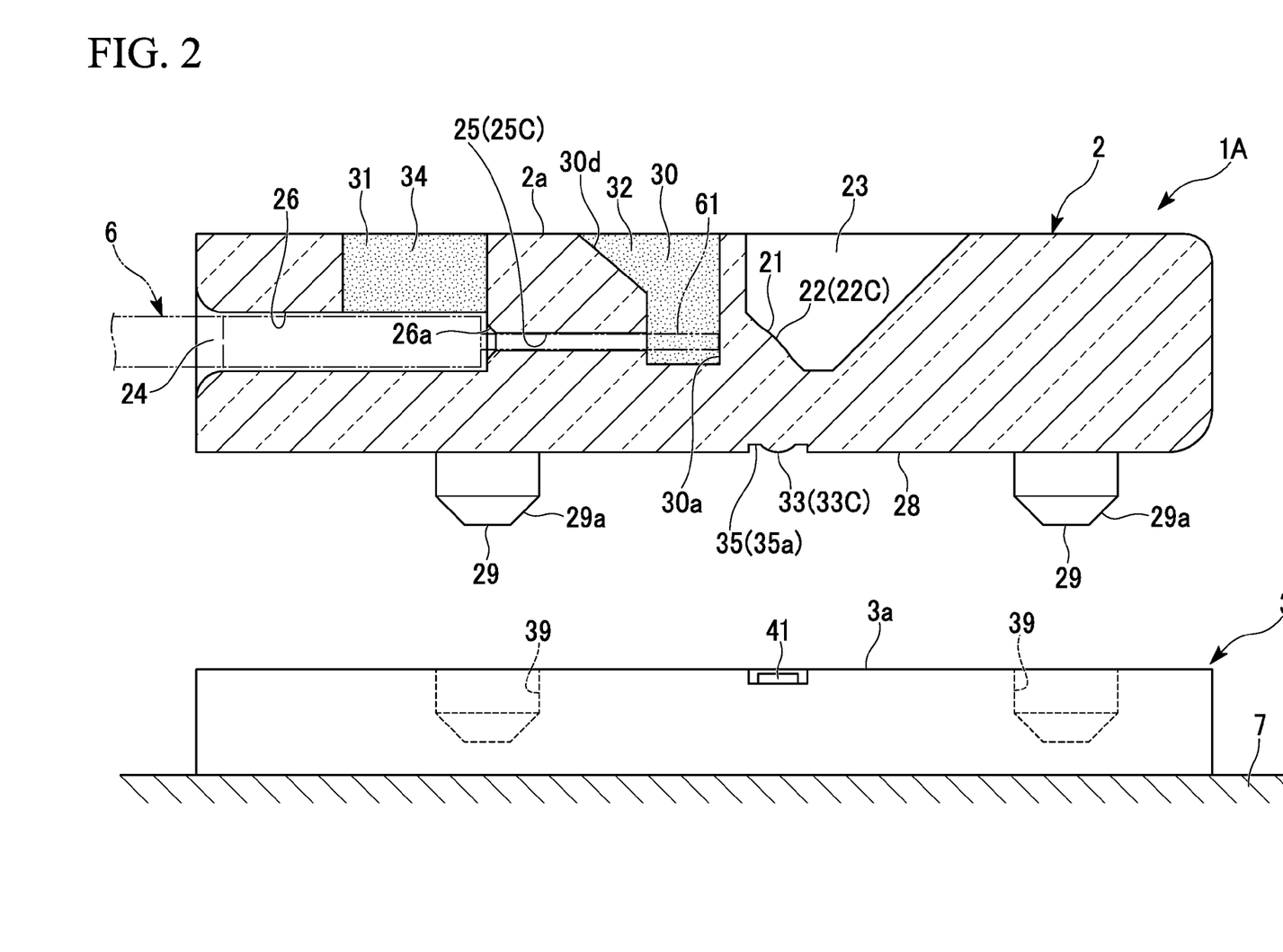
FIG. 2 is a cross-sectional view of the optical path-changing member shown in FIG. 1.
Figure 3:
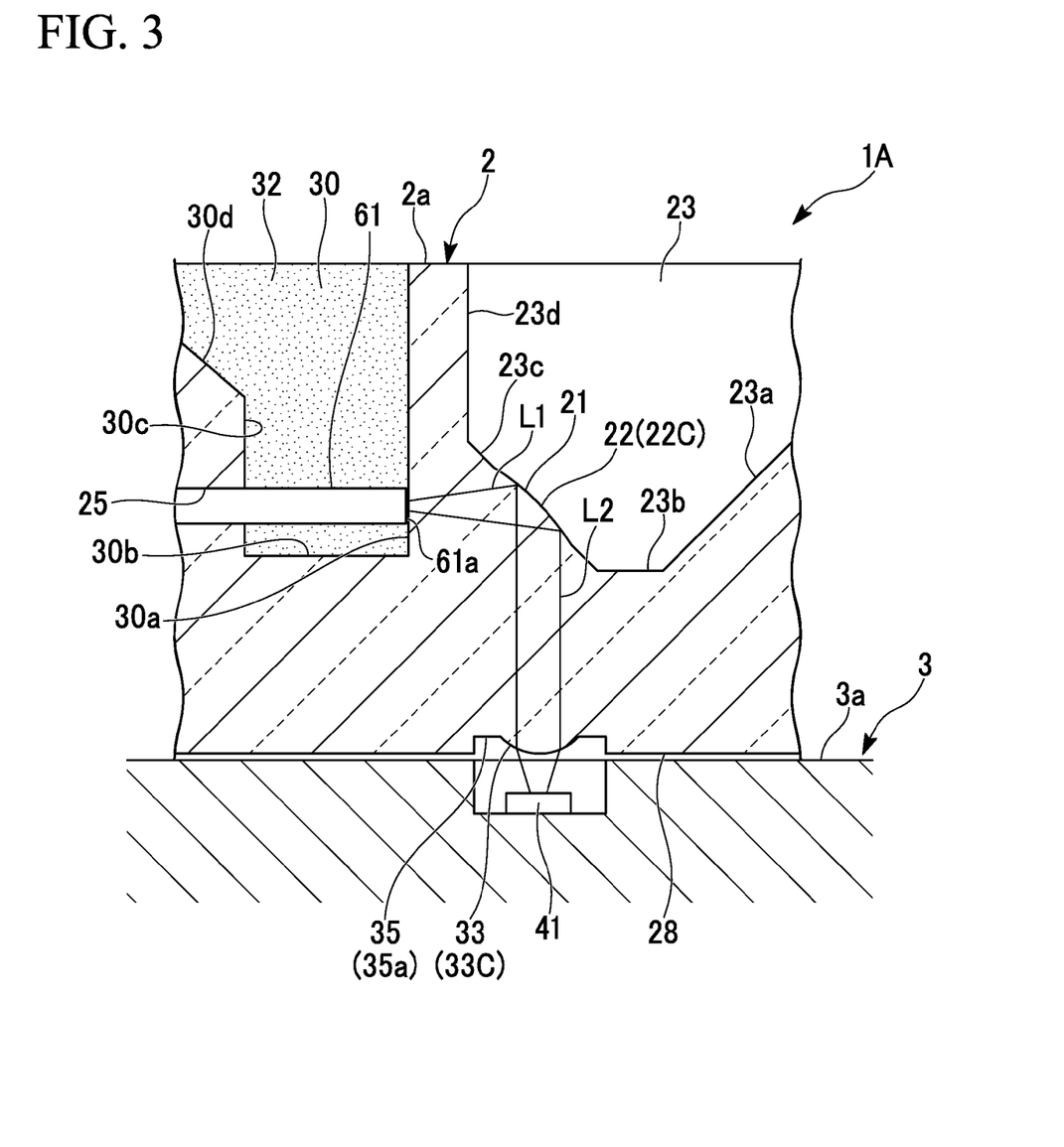
FIG. 3 is an enlarged cross-sectional view of the optical path-changing member shown in FIG. 1.

FIG. 1 is a perspective view of an optical path-changing member 1A of the first embodiment related to the present invention. FIG. 2 is a cross-sectional view of the optical path-changing member 1A. FIG. 3 is an enlarged cross-sectional view of the optical path-changing member 1A.

In the following description, a leading end direction (the right direction in FIG. 2) of a multi-core optical fiber 6 is sometimes referred to as the front and the opposite direction (the left direction in FIG. 2) thereto is sometimes referred to as the rear. Further, the front-back direction is a direction of an optical axis of the multi-core optical fiber 6.

As shown in FIGS. 1 and 2, a member main body 2 constituting the optical path-changing member 1A is provided at a terminal of the multi-core optical fiber 6, and the member main body 2 is installed to face an optical module 3 (an optical component), whereby a light input and output end 41 in the optical module 3 and the multi-core optical fiber 6 are optically connected.

The light input and output end 41 is a light input and output end of at least one of a light-emitting element and a light-receiving element.

The multi-core optical fiber 6 is, for example, an optical fiber ribbon and has a plurality of optical fibers 61 bundled together by a tape coating.

The multi-core optical fiber 6 in this embodiment is arranged in one stage. In addition, as the multi-core optical fiber 6, it is not limited to a multi-core optical fiber ribbon and various configurations such as a plurality of single-core optical fibers, for example, can be adopted.

As shown in FIG. 2, the optical module 3 is made in, for example, a plate shape, a block shape, or the like and a plurality of light input and output ends 41 can be mounted thereon (or built therein).

The optical module 3 is provided on a circuit board 7 and has a function to drive the light-emitting element (the light input and output end 41) on the basis of a control signal from a drive circuit on the circuit board 7 and/or a function to transmit an electric signal according to a light-receiving signal of the light-emitting element (the light input and output end 41) to a processing circuit on the circuit board 7.

The upper surface of the optical module 3 becomes a joint surface 3a on which the member main body 2 is mounted.

The light input and output ends 41 are arranged in the width direction (a direction perpendicular to the plane of paper in FIG. 2) of the optical module 3 to correspond to an array of the optical fibers 61 constituting the multi-core optical fiber 6.

As the light input and output end 41, there is a light-emitting element such as a surface emission type laser diode (VCSEL) or a light-receiving element such as a photodiode (PD).

A direction of an optical axis of the light input and output end 41 is made to be approximately perpendicular to the optical module 3 (the joint surface 3a) (refer to FIG. 2). In addition, the direction of the optical axis of the light input and output end 41 may also be inclined at an angle other than 90° with respect to the circuit board 7.

In addition, although not particularly shown, a photoelectric conversion circuit, a control-processing section, an optical signal-processing circuit, an optical element-driving circuit, and various other circuits that perform drive control or the like of electronic components on the circuit board are configured in the circuit board 7 on which the optical module 3 is mounted.

The member main body 2 is a member for optically connecting the multi-core optical fiber 6 and the light input and output end 41, which is provided so as to cover the leading end side of the multi-core optical fiber 6. As described above, since the optical axis of the multi-core optical fiber 6 and the optical axis of the light input and output end 41 are inclined to each other, optical connection is made by changing an optical path by a reflection section 21 provided in the member main body 2.

The member main body 2 is made of a transparent material and is a block-shaped member having the reflection section 21. As a material constituting the member main body 2, for example, polycarbonate, modified polyolefin, epoxy-based resin, or the like is preferable.

As shown in FIGS. 2 and 3, a reflection section formation concave portion 23 that forms the reflection section 21, a leading end disposition concave portion 30 in which leading ends 61a of the optical fibers 61 are disposed, and an opening portion for filling 31 that leads to a multi-core optical fiber insertion hole 24 are formed in an upper surface 2a (the opposite surface to a light incidence and emission surface 28) of the member main body 2.

The reflection section formation concave portion 23 has the form of a groove extending along the width direction of the member main body 2 (refer to FIG. 1).

As shown in FIG. 3, the reflection section formation concave portion 23 has a front inclined surface 23a that descends as it goes backward, a bottom surface 23b formed along the joint surface 3a of the optical module 3 toward the rear from a lower end of the front inclined surface 23a, a rear inclined surface 23c that ascends as it goes backward from a rear end of the bottom surface 23b, and a drooping surface 23d formed along a depth direction (a direction perpendicular to the joint surface 3a of the optical module 3, a vertical direction in FIG. 2) from a rear end of the rear inclined surface 23c.

At least a portion of the rear inclined surface 23c becomes the reflection section 21 that optically connects the multi-core optical fiber 6 to the light input and output end 41.

The reflection section 21 is formed so as to be located on the extended line of the optical axis of the multi-core optical fiber 6 and also located above the light input and output end 41 when the member main body 2 has been fixed onto the optical module 3.

The reflection section 21 is formed to be inclined with respect to the direction of the optical axis of the multi-core optical fiber 6 (the left-right direction in FIG. 2) and the direction of the optical axis of the light input and output end 41 (the vertical direction in FIG. 2), and can make light emitted from the multi-core optical fiber 6 and incident on the inside of the member main body 2 be internally reflected in the member main body 2, thereby being directed to the light input and output end 41, or make light emitted from the light input and output end 41 and incident on the inside of the member main body 2 be internally reflected, thereby being directed to the leading end 61a of the multi-core optical fiber 6.

The reflection section 21 optically connects the multi-core optical fiber 6 and the light input and output end 41 by internal reflection in the member main body 2 on the basis of a refractive index difference between a constituent material of the member main body 2 and air in the reflection section formation concave portion 23. The higher the reflection efficiency in the reflection section 21, the more preferable. In the inside of the reflection section formation concave portion 23, other gases satisfying an appropriate refractive index difference between it and the constituent material may also be present.

In the member main body 2, first lenses 22 of the same number as the number of optical fibers 61 constituting the multi-core optical fiber 6 are formed. The first lenses 22 are aspheric lenses each having a concave shape when viewed from the multi-core optical fiber and the light input and output end 41 (that is, when viewed from an incident direction of light).

The curvature of the first lens 22 is designed, for example, such that light L1 emitted from the multi-core optical fiber 6 (the optical fiber 61) is reflected by the first lens 22 and then turned into parallel light L2 having an approximately circular cross-section and perpendicular to the direction of the optical axis of the multi-core optical fiber 6 (refer to FIG. 3). It is preferable that the curvature of the first lens 22 be designed such that an end face of the multi-core optical fiber 6 (the optical fiber 61) is located at a light condensing point of reflected light (the light L1).

It is preferable that the first lens 22 be formed such that the center of the lens is located on the reflection section 21 and on the extended line in the direction of the optical axis of the optical fiber 61 and the extended line of the optical axis of the light input and output end 41.

The first lenses 22 form a first lens row 22C arranged along the width direction of the member main body 2 to correspond to an array of the optical fibers 61 constituting the multi-core optical fiber 6.

At a rear portion of the member main body 2, the multi-core optical fiber insertion hole 24 is formed along the front-back direction. A rear end of the multi-core optical fiber insertion hole 24 is opened at the rear surface of the member main body 2.

The multi-core optical fiber insertion hole 24 can make the multi-core optical fiber 6 have a shape that can be retained therein. Specifically, the multi-core optical fiber insertion hole 24 has optical fiber insertion holes 25 into which the optical fibers 61 of the multi-core optical fiber 6 are inserted, and a multi-core optical fiber holding portion 26 corresponding to an outer diameter of the tape coating covering the optical fibers 61. The optical fiber insertion holes 25 are formed in the same number as the number of optical fibers 61.

A first tapered portion 26a playing the role of a guide when inserting the optical fibers 61 into the optical fiber insertion holes 25 is formed between the optical fiber insertion holes 25 and the multi-core optical fiber holding portion 26.

The leading end disposition concave portion 30 is formed further to the rear than the reflection section formation concave portion 23 and has the form of a groove extending along the width direction of the member main body 2 (refer to FIG. 1).

As shown in FIG. 3, the leading end disposition concave portion 30 has an incidence and emission surface 30a formed along the depth direction (the direction perpendicular to the joint surface 3a of the optical module 3, the vertical direction in FIG. 2), a bottom surface 30b formed along the joint surface 3a toward the rear from a lower end of the incidence and emission surface 30a, a rear surface 30c formed along the depth direction (the direction perpendicular to the joint surface 3a of the optical module 3, the vertical direction in FIG. 2) from a rear end of the bottom surface 30b, and a rear inclined surface 30d that ascends as it goes backward from an upper end of the rear surface 30c.

The optical fiber insertion holes 25 are opened at the rear surface 30c.

The incidence and emission surface 30a is formed so as to position the leading ends 61a of the optical fibers 61 inserted into the optical fiber insertion holes 25 and then disposed in the leading end disposition concave portion 30 at predetermined positions.

For example, the incidence and emission surface 30a is formed such that the leading ends 61a of the optical fibers 61 match the light condensing points by the first lenses 22 when the multi-core optical fiber 6 is inserted such that the leading ends 61a of the optical fibers 61 hit the incidence and emission surface 30a.

The leading ends 61a of the optical fibers 61 face the incidence and emission surface 30a in proximity thereto or in contact therewith.

The leading ends 61a of the optical fibers 61 are fixed to the member main body 2 (specifically, the inner surface of the leading end disposition concave portion 30) by filling and hardening an adhesive 32 in the leading end disposition concave portion 30.

Since the leading end disposition concave portion 30 has the rear inclined surface 30d, the dimension (the dimension in the front-back direction) of an opening portion can be increased, and therefore, the adhesive 32 is easily introduced into the leading end disposition concave portion 30. Therefore, the leading ends 61a of the optical fibers 61 can be reliably fixed to the member main body 2.

The optical fiber insertion holes 25 form an optical fiber insertion hole row 25C that is made by arranging a plurality of optical fiber insertion holes 25 side by side in the width direction of the member main body 2.

The optical fiber insertion holes 25 are formed such that two adjacent optical fiber insertion holes 25 and 25 are positioned at equal intervals. In this way, a large number of optical fibers 61 can be inserted and assembled in the member main body 2 in a bundle for each multi-core optical fiber 6.

The opening portion for filling 31 is formed further to the rear than the leading end disposition concave portion 30 and extends along the width direction of the member main body 2 (refer to FIG. 1).

An adhesive 34 is filled and hardened in the opening portion for filling 31, whereby the multi-core optical fiber 6 is fixed to the member main body 2 (specifically, the inner surfaces of the multi-core optical fiber insertion hole 24 and the opening portion for filling 31).

The lower surface of the member main body 2 in FIG. 2 is the light incidence and emission surface 28 facing the joint surface 3a of the optical module 3 and a plurality of second lenses 33 is formed in the light incidence and emission surface 28.

The second lens 33 is a spherical lens having a convex shape protruding toward the optical module 3 (a shape protruding downward in FIG. 2) and is disposed on the extended line of the optical axis of the light input and output end 41.

The second lenses 33 form a second lens row 33C arranged along the width direction of the member main body 2 according to the positions of the first lenses 22 (the first lens row 22C).

It is preferable that the second lens 33 be formed on a bottom surface 35a of a concaved protective portion 35 formed in the light incidence and emission surface 28. The bottom surface 35a may be made to be parallel to the light incidence and emission surface 28.

It is preferable that the protrusion height of the second lens 33 be smaller than the depth of the concaved protective portion 35. Accordingly, when the member main body 2 is installed on the optical module 3, the second lens 33 can be prevented from being damaged by a collision or the like with the optical module 3.

In a case of assembling the member main body 2 to a leading end of the multi-core optical fiber 6, after the individual optical fibers 61 are exposed by removing the coating of a leading end portion of the multi-core optical fiber 6, the multi-core optical fiber 6 is inserted from the rear of the member main body 2. At this time, positioning between the leading ends 61a of the optical fibers 61 and the first lenses 22 is performed by performing insertion such that the leading ends 61a of the optical fibers 61 hit the incidence and emission surface 30a of the leading end disposition concave portion 30.

As shown in FIGS. 1 to 3, the member main body 2 has two positioning pins 29 (positioning concave portions) protruding from the light incidence and emission surface 28 that faces the optical module 3.

The positioning pin 29 in the illustrated example is formed in a substantially columnar shape and has a tapered portion 29a, a diameter of which is gradually reduced toward a leading end. The positioning pins 29 are disposed to be spaced front and back at positions that are at approximately the center in the width direction of the member main body 2 and do not interfere with the optical path. The positioning pins 29 can be formed by integral molding with the member main body 2.

As shown in FIG. 2, in the optical module 3, pinholes for positioning 39 (positioning concave portions) are formed in the joint surface 3a facing the member main body 2. The shape of the pinhole for positioning 39 is designed to fit to the shape of the positioning pin 29 such that the positioning pin 29 is positioned with a high degree of accuracy. The pinhole for positioning 39 in the illustrated example is a hole having a circular cross-section, into which the positioning pin 29 having a columnar shape is fitted.

In a case where the multi-core optical fiber 6 incorporated into the member main body 2 is optically connected to the light input and output end 41 mounted on the optical module 3, as shown in FIG. 2, the member main body 2 and the optical module 3 are fitted to each other by making the light incidence and emission surface 28 of the member main body 2 face the joint surface 3a of the optical module 3 and then inserting the positioning pins 29 protruding from the light incidence and emission surface 28 of the member main body 2 into the pinholes of positioning 39 formed in the joint surface 3a of the optical module 3.

In this way, the multi-core optical fiber 6 arranged so as to face the reflection section 21 is correctly positioned with respect to the light input and output end 41 and the multi-core optical fiber 6 is optically connected to the light input and output end 41 through the reflection section 21.

In addition, the positioning pin 29 is not limited to the illustrated example and may also be a separate member from the member main body 2. Further, a configuration is also possible in which a positioning pin protrudes from the optical module 3 side and is fitted into a pinhole for positioning formed on the member main body 2 side. The number of positioning pins 29 is not particularly limited and can be one, two, or three or more according to a purpose or the like. The shapes of the positioning pin 29 and the pinhole for positioning 39 are also not particularly limited and the positioning pin 29 and the pinhole for positioning 39 having various shapes such as an elliptical shape and a polygonal shape (for example, a rectangular shape or the like) according to a purpose or the like can be adopted.

As shown in FIG. 3, since the first lens 22 and the second lens 33 are interposed in the optical path between the multi-core optical fiber 6 and the light input and output end 41, the light L1 emitted from the multi-core optical fiber 6 (the optical fiber 61) is reflected by the first lens 22 and then turned into the parallel light L2 perpendicular to the direction of the optical axis of the multi-core optical fiber 6 and the light is condensed by the second lens 33 and is incident on the light input and output end 41.

Light emitted from the light input and output end 41 passes through the second lens 33, thereby being turned into the light L2 parallel to the optical axis of the light input and output end 41, then is reflected and also condensed (the light L1) by the first lens 22, and is incident on the leading end 61a of the optical fiber 61.

In the optical path-changing member 1A, since the first lens 22 and the second lens 33 are formed in the light incidence and emission surface 28, even in a case where a shift occurs in the direction of incident light, the direction of the optical path can be maintained in a desired direction by the two lenses 22 and 33.

Since both the first lens 22 and the second lens 33 are formed in the member main body 2, the relative positions of the two lenses 22 and 33 do not change, and therefore, a highly accurate optical path change is possible.

Further, due to a configuration in which the first lens 22 having a concave shape when viewed from the incident direction is formed and condenses light incident on the reflection section 21, a change of the direction of the optical path can be more accurately performed.

In the optical path-changing member 1A, since the optical fiber insertion hole 25 precisely positioning the multi-core optical fiber 6 and the reflection section 21 are formed in the member main body 2 that is a block-shaped integral component and the mutual positional relationship between the direction of the optical axis of the optical fiber 61 and the reflection section 21 is fixed with a high degree of accuracy, the respective optical fibers 61 and the respective light input and output ends 41 are precisely correlated with each other. Further, a reduction in the size of the overall configuration as an optical connector also becomes possible.

Second Embodiment

Figure 4:
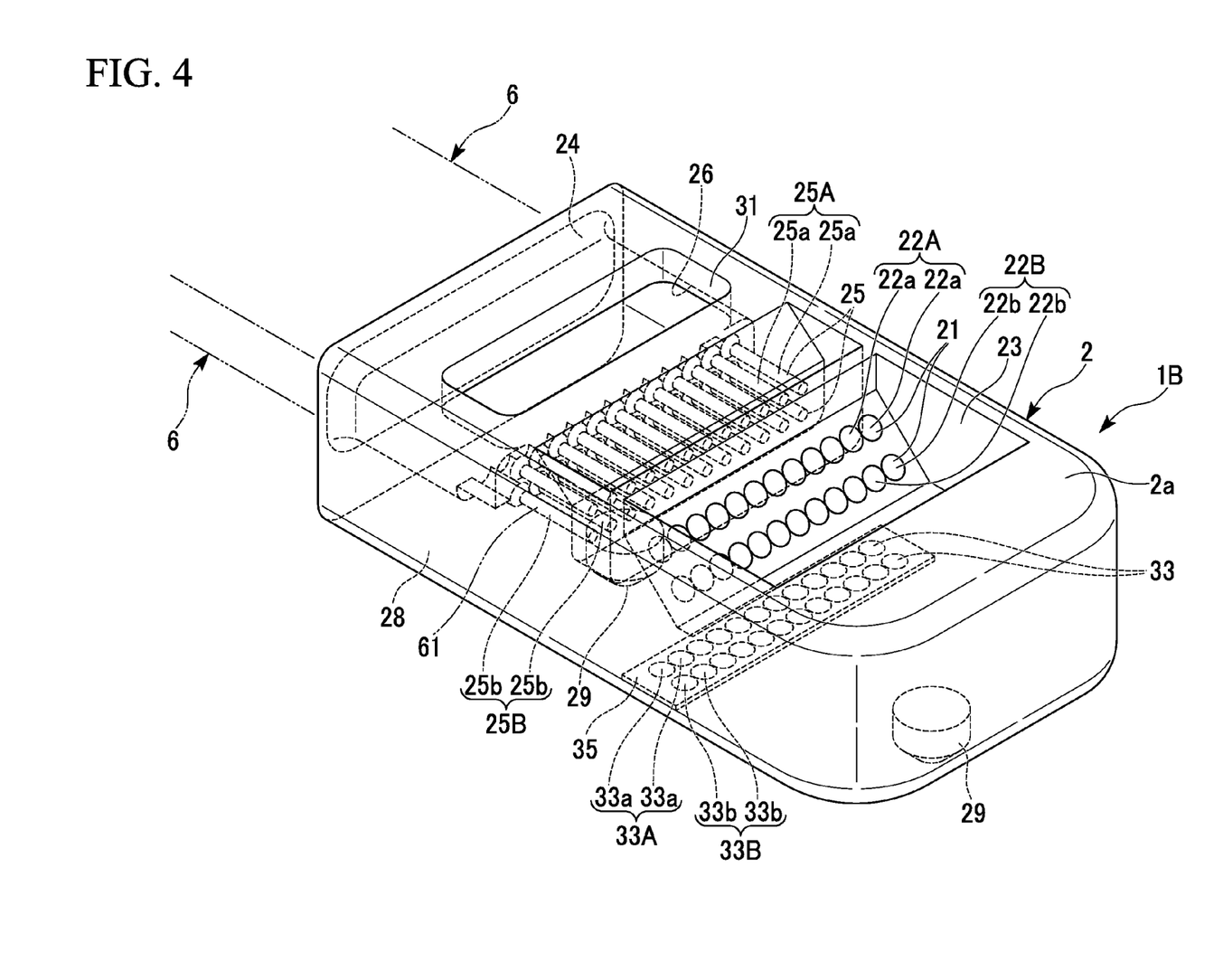
FIG. 4 is a perspective view of an optical path-changing member of a second embodiment related to the present invention.
Figure 5:
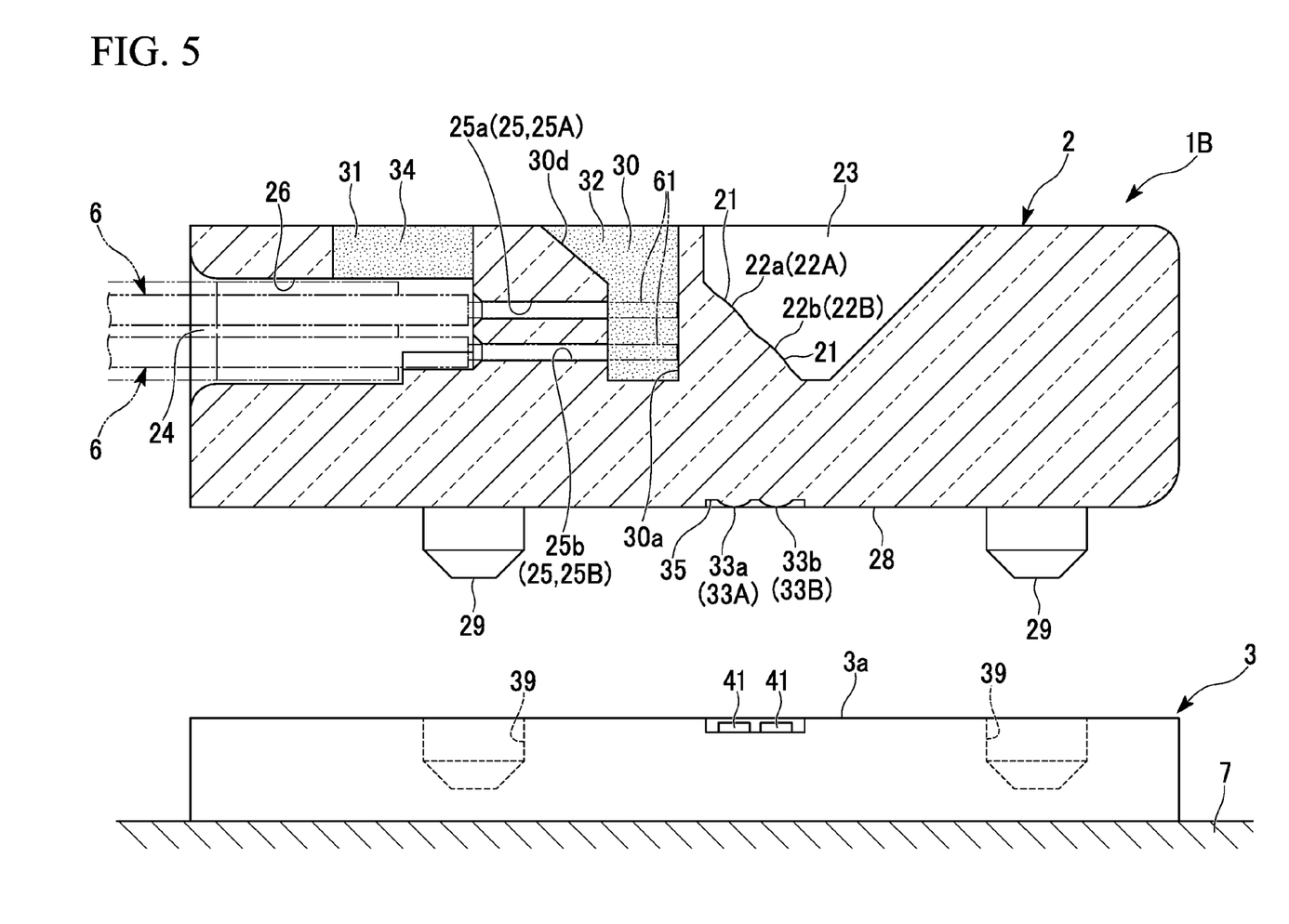
FIG. 5 is a cross-sectional view of the optical path-changing member shown in FIG. 4.
Figure 6:
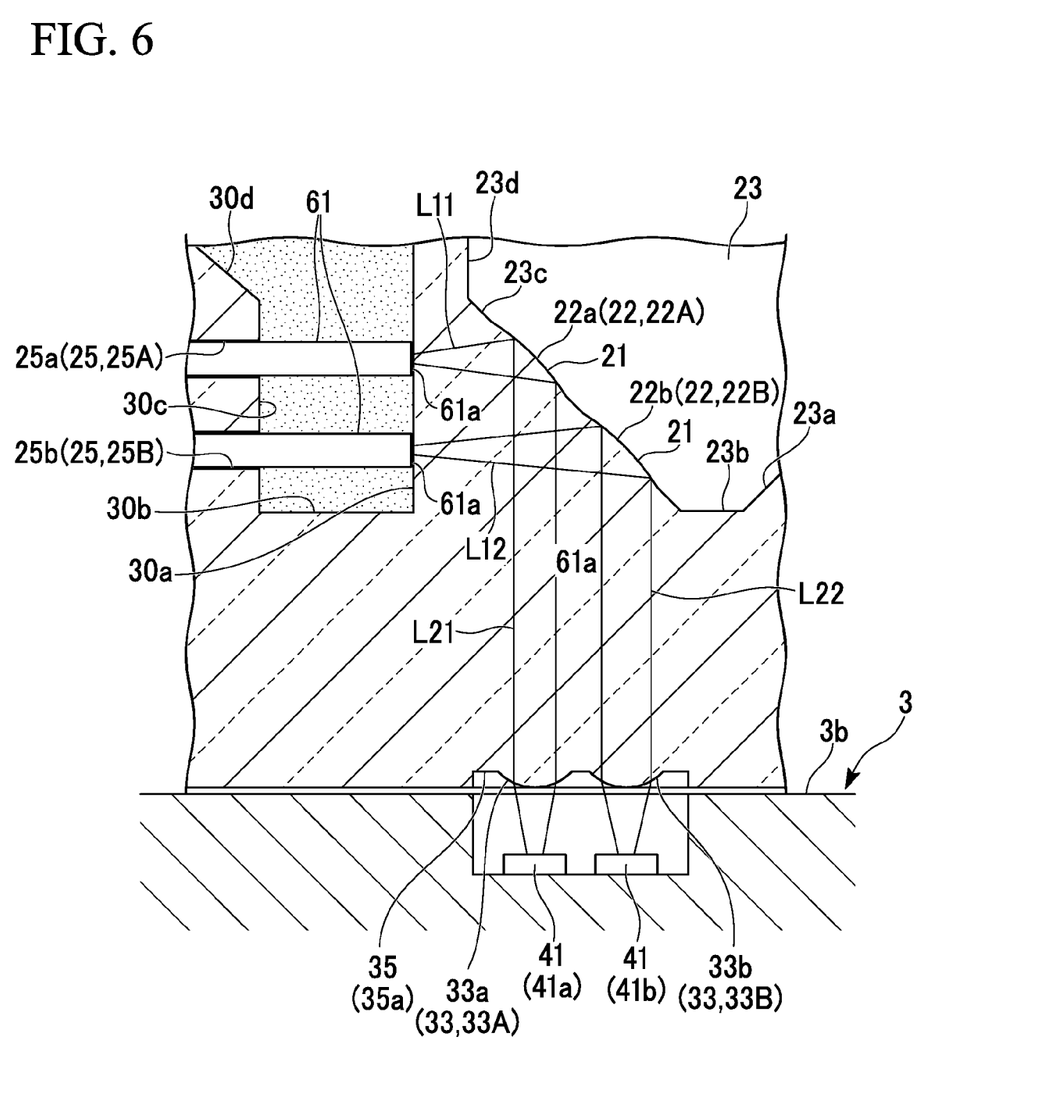
FIG. 6 is an enlarged cross-sectional view of the optical path-changing member shown in FIG. 4.

FIG. 4 is a perspective view of an optical path-changing member 1B of a second embodiment related to the present invention. FIG. 5 is a cross-sectional view of the optical path-changing member 1B. FIG. 6 is an enlarged cross-sectional view of the optical path-changing member 1B.

As shown in FIGS. 4 and 5, optical fiber insertion holes 25 (25a and 25b) and first lenses 22 (22a and 22b) of the optical path-changing member 1B are two-dimensionally arranged so as to form a plurality of stages.

The optical fiber insertion holes 25 (25a and 25b) form a plurality of stages 25A and 25B (optical fiber insertion hole rows) that are made by arranging a plurality of optical fiber insertion holes 25 side by side in a lateral direction, and the first lenses 22 (22a and 22b) form a plurality of stages 22A and 22B that are made by arranging a plurality of first lenses 22 side by side in a lateral direction.

The optical fiber insertion holes 25 and the first lenses 22 are arranged in two stages to correspond to the multi-core optical fibers 6 having a two-stage configuration.

Second lenses 33 (33a and 33b) form a plurality of stages 33A and 33B that are made by arranging a plurality of second lenses 33 side by side in a lateral direction to correspond to the positions of the first lenses 22 (the stages 22A and 22B).

In the following description, for convenience, the respective stages 25A, 25B, 22A, 22B, 33A, and 33B are sometimes distinguished as first stages 25A, 22A, and 33A and second stages 25B, 22B, and 33B in the order that a distance from the light incidence and emission surface 28 is small.

As shown in FIG. 6, since the first lenses 22 (the stages 22A and 22B) and the second lenses 33 (the stages 33A and 33B) are interposed in the optical paths between the multi-core optical fibers 6 and the light input and output ends 41, lights L11 and L12 emitted from the multi-core optical fibers 6 are reflected by the first lenses 22a and 22b and then turned into parallel lights L21 and L22 each having an approximately circular cross-section and being perpendicular to the directions of the optical axes of the multi-core optical fibers 6 and the lights are condensed by the second lenses 33a and 33b and are incident on the light input and output ends 41.

Lights emitted from the light input and output ends 41 pass through the second lenses 33a and 33b (the stages 33A and 33B), thereby being turned into the lights L21 and L22 parallel to the optical axes of the light input and output ends 41, then are reflected and also condensed (the lights L11 and L12) by the first lenses 22a and 22b (the stages 22A and 22B), and are incident on the leading ends 61a of the optical fibers 61.

In the first lens 22a of the first stage 22A in which a distance from the leading end 61a of the optical fiber 61 (the optical fiber 61 inserted into the optical fiber insertion hole 25a) (a distance from the incidence and emission surface 30a) is small, the diameter of light from the optical fiber 61 becomes small, compared to light that reaches the first lens 22b of the second stage 22B. Therefore, as the first lens 22a, a lens having a small diameter compared to the first lens 22b is used.

The reflected light is directed to the second lens 33a of the first stage 33A as the parallel light L21 having a small diameter (in contrast with the first lens 22b).

In the first lens 22a, a distance from the incidence and emission surface 30a of the leading end disposition concave portion 30, with which the leading end 61a of the optical fiber 61 comes into contact (or to which the leading end 61a comes close), is small, compared to the first lens 22b.

In the first lens 22b of the second stage 22B in which a distance from the leading end 61a of the optical fiber 61 (the optical fiber 61 inserted into the optical fiber insertion hole 25b) (a distance from the incidence and emission surface 30a) is large, the diameter of light from the optical fiber 61 becomes large, compared to light that reaches the first lens 22a, due to the influence of diffusion. Therefore, as the first lens 22b, a lens having a large diameter compared to the first lens 22a is used.

The reflected light is directed to the second lens 33b of the second stage 33B as the parallel light L22 having a large diameter (in contrast with the first lens 22a).

In the optical path-changing member 1B, similarly to the optical path-changing member 1A, since the first lenses 22 (22a and 22b) and the second lenses 33 (33a and 33b) are formed in the light incidence and emission surface 28, even in a case where a shift occurs in the direction of incident light, the direction of the optical path can be maintained in a desired direction.

Further, since both the first lens 22 and the second lens 33 are formed in the member main body 2, the relative positions of the two lenses 22 and 33 do not change, and therefore, a highly accurate optical path change is possible.

In the illustrated example, the light input and output ends 41 of the optical module 3 are respectively provided at positions facing the second lenses 33a and 33b. Specifically, the light input and output ends 41 include a light input and output end 41a of a first stage corresponding to the second lens 33a of the first stage 33A and a light input and output end 41b of a second stage corresponding to the second lens 33b of the second stage 33B (refer to FIG. 6).

It is preferable that among the light input and output ends 41 formed in plural stages in this manner, the light input and output end 41a of the first stage corresponding to the first lens 22a in which a distance from the optical fiber 61 is relatively small be a light input and output end of a light-receiving element.

This is because since the first lens 22a is close to the optical fiber 61, the diameter of light reaching the first lens 22a from the optical fiber 61 is small, and thus interference with light from another optical fiber 61 does not easily occur, and therefore, an adverse effect in the light-receiving element can be suppressed.

The light input and output end 41b of the second stage can be set to be a light input and output end of a light-emitting element.

In a case where the light input and output ends 41 are formed in three or more stages, it is preferable that among them, at least one stage among the light input and output ends 41 of the stages belonging to the number of stages equivalent to half of the total number of stages counting from the stage corresponding to the first lens in which a distance from the optical fiber is the smallest be a light input and output end of a light-receiving element.

Third Embodiment

Figure 7:
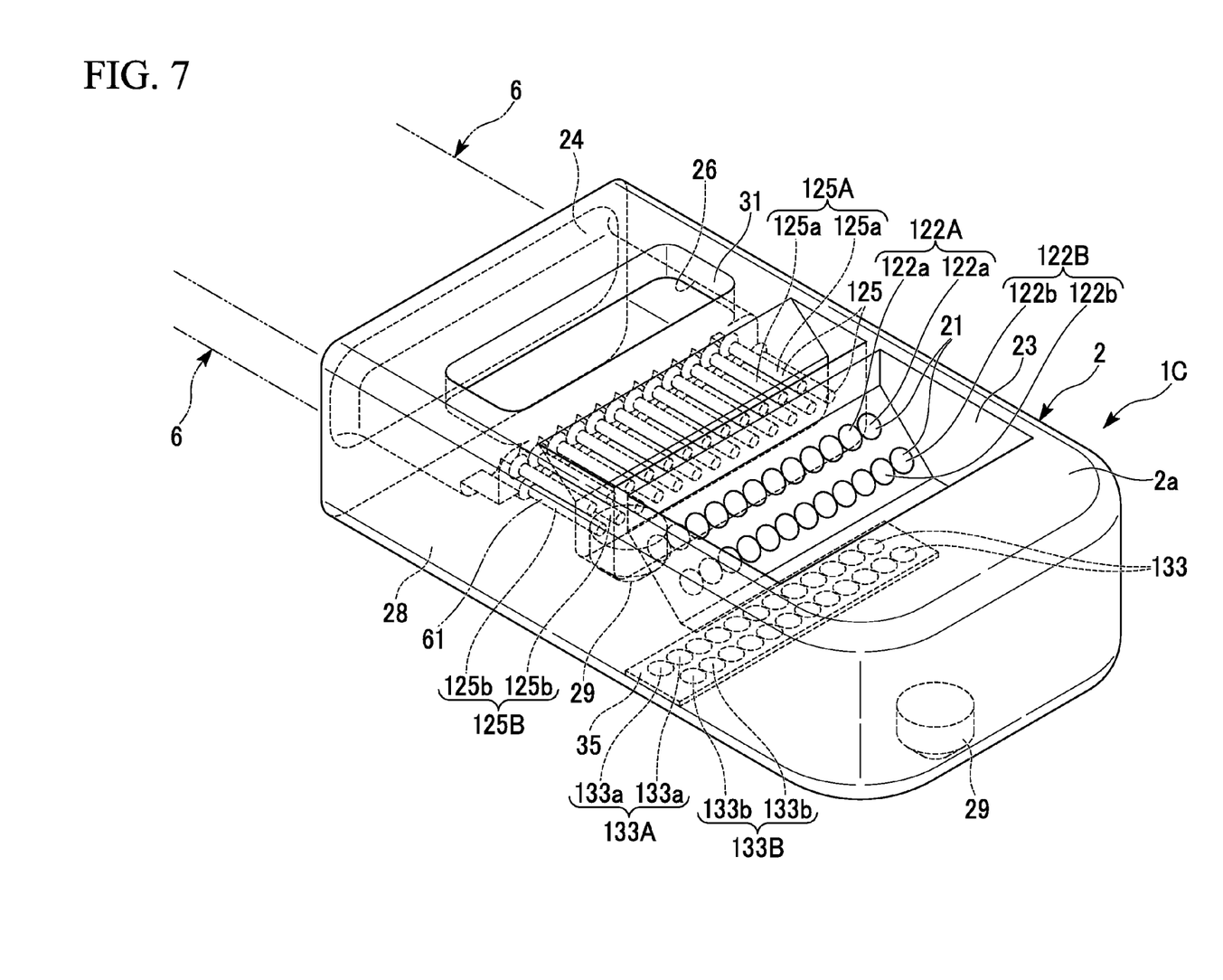
FIG. 7 is a perspective view of an optical path-changing member of a third embodiment related to the present invention.
Figure 8:
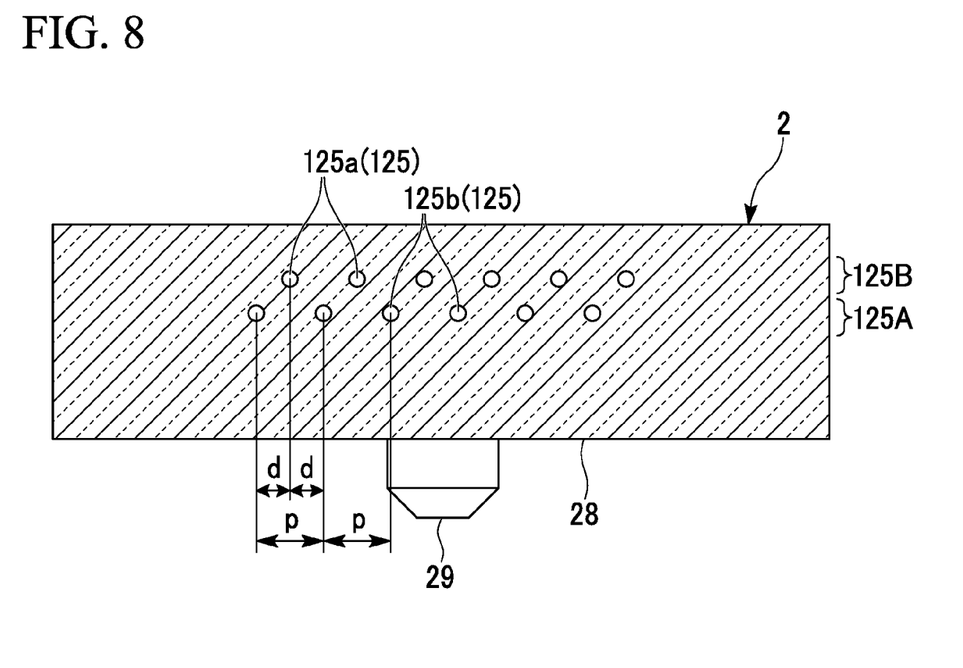
FIG. 8 is a cross-sectional view of the optical path-changing member shown in FIG. 7.

FIG. 7 is a perspective view of an optical path-changing member 1C of a third embodiment related to the present invention. FIG. 8 is a cross-sectional view of the optical path-changing member 1C.

As shown in FIGS. 7 and 8, optical fiber insertion holes 125 (125a and 125b) and first lenses 122 (122a and 122b) are two-dimensionally arranged so as to form a plurality of stages. The first lenses 122 (122a and 122b) form a plurality of stages 122A and 122B that are made by arranging a plurality of first lenses 122 side by side in a lateral direction.

The optical fiber insertion holes 125 and the first lenses 122 are arranged in two stages to correspond to the multi-core optical fibers 6 having a two-stage configuration.

When viewed from the direction of the optical axis of the light, positions of the optical fiber insertion holes 125 correspond to positions of the first lenses 122. Here, therefore, the embodiment will be described with reference to the positions of the optical fiber insertion holes 125.

The optical fiber insertion holes 125 form two stages 125A and 125B, and in each of the stages 125A and 125B, a plurality of the optical fiber insertion holes 125 is arranged in a width direction with equal spacing (of pitch p).

Therefore, for each multi-core optical fiber 6, the plurality of optical fibers 61 are collectively inserted to the member main body 2, and the optical path-changing member 1C can be assembled. When the pitch p between the distance of the centers of the naked optical fiber insertion holes 125, which belong to the same stage 125A or 125B and are adjacent to each other, is set so as to correspond to a pitch of the optical fibers 61 in a ribbon, it is preferable since each of the optical fibers are arranged in parallel and an increase of the transmission loss and so on due to flection of the optical fibers can be reduced.

Positions of the optical fiber insertion holes 125 belong to the first stage 125A and positions of the optical fiber insertion holes 125 belong to the second stage 125B are mutually shifted in the width direction of the member main body 2 (a horizontal direction in FIG. 8).

Here, amplitude of the shift d (a shift amount) secured between the first stage 125A and the second stage 125B is greater than a beam diameter of the optical path such that optical paths do not overlap each other. The shift amount d is set to be greater than a diameter of a core of the optical fibers 61 since the beam diameter of the optical path is merely slightly greater than the diameter of the core in view of beam diffusion.

As described above, since the positions of the optical fiber insertion holes 125 correspond to the positions of the first lenses 122 when viewed from the direction of the optical axis of the light, a pitch p between the distance of the centers of each first lens 122 and a shift amount d are the same as those of the optical fiber insertion holes 125.

Second lenses 133 and the light input and output ends 41 (see FIGS. 5 and 6) are arranged such that when seen from a planar view, the positions thereof correspond to the positions of the first lenses. The second lenses 133 and the light input and output ends 41 are also two-dimensionally arranged so as to form a plurality of stages. Therefore, the pitch and the shift amount are the same as those of the optical fiber insertion holes 125 and the first lenses 122.

Second lenses 133 (133a and 133b) form a plurality of stages 133A and 133B that are made by arranging a plurality of second lenses 133 side by side in a lateral direction to correspond to the positions of the first lenses 122 (the stages 122A and 122B).

As shown in FIG. 7, the optical fiber insertion holes 125 are arranged in a zigzag manner where the positions of the optical fiber insertion holes 125 belong to the first stage 125A and the positions of the optical fiber insertion holes 125 belong to the second stage 125B are mutually shifted. Therefore, the distance between the optical fibers 61 positioned by the optical fiber insertion holes 125 is broader.

Therefore, occurrences of noises or interference of a signal light caused by beam diffusion to an optical path of the adjacent optical fibers 61 are prevented and preferable optical connections can be realized.

In addition, since the optical fiber insertion holes 125 are arranged in a zigzag manner, while occurrences of noises or interference of a signal light are prevented, it is possible for the two stages to be closer in the height direction. As a result, packaging density of the optical fibers 61 can be increased.

In FIGS. 4 to 8 and the like, an embodiment has been shown in which each of the optical fiber insertion hole 25 and the lenses 22 and 33 is two stages. However, in the present invention, it is also possible to arrange each of them in three or more stages.

In this case, a configuration is possible in which the first lens of one stage among the first lenses formed in three or more stages has a smaller distance from the optical fiber than in the first lens of one stage except that and can make light from the optical fiber be directed to the second lens as parallel light having a relatively small diameter.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical path-changing member that is provided at a terminal of an optical fiber and installed at a position facing an optical component in which a light input and output end is provided having an optical axis inclined with respect to a direction of an optical axis of the terminal, the optical path-changing member comprising
    a member main body which is made of a transparent material and in which a reflection section optically connecting the optical fiber to the light input and output end is formed, wherein:
    the reflection section is a first lens having a concave shape when viewed from an incident direction and making light incident on the inside of the member main body from one of the optical fiber and the light input and output end be internally reflected in the member main body and directed to the other of the optical fiber and the light input and output end;
    a second lens having a convex shape toward the optical component is formed in a light incidence and emission surface of the member main body, which faces the optical component;

the first lens is an aspheric lens that can make light from the optical fiber parallel by the internal reflection and make the light be directed to the second lens or can condense light from the light input and output end and make the light be directed to the optical fiber;

the second lens is a spherical lens that can condense light from the first lens and make the light be directed to the light input and output end or can make light from the light input and output end parallel and make the light be directed to the first lens;

the optical fiber is a multi-core optical fiber arranged in two stages;

an optical fiber insertion hole row in which a plurality of optical fiber insertion holes, each of which is for inserting a core of the multi-core optical fiber therein, is arranged is formed in two or more stages in the member main body;

the first lens comprising first lenses of two or more stages are provided in lines at positions on extended lines of the optical fiber insertion hole rows;

the second lens comprising second lenses of two or more stages are provided in lines at positions corresponding to the first lenses;

a first lens of a first stage among the first lenses formed in the two stages has a smaller distance from a core of the multi-core optical fiber in the first stage than a distance between a first lens of a second stage among the first lenses formed in the two stages and a core of the multi-core optical fiber in the second stage, and can make light from the multi-core optical fiber in the first stage be directed to the second lens of the first stage as parallel light having a smaller diameter in contrast with the first lens of the second stage;

the light input and output end corresponding to the first lens of the first stage is a light input and output end of a light-receiving element; and the light input and output end corresponding to the first lens of the second stage is a light input and output end of a light-emitting element.

2. The optical path-changing member according to claim 1, wherein the second lens is formed on a bottom surface of a concaved protective portion formed in the light incidence and emission surface, and a protrusion height of the second lens is made smaller than the depth of the concaved protective portion.

3. The optical path-changing member according to claim 1, wherein in the member main body, a leading end disposition concave portion in which a leading end of the optical fiber is disposed is formed in an opposite surface to the light incidence and emission surface, and the leading end disposition concave portion is filled with an adhesive that fixes the leading end of the optical fiber to the member main body.

4. The optical path-changing member according to claim 1, wherein the reflection section is at least a portion of an inner surface of a reflection section formation concave portion formed in an opposite surface to the light incidence and emission surface of the member main body and is formed to be inclined with respect to directions of optical axes of the optical fiber and the light input and output end.

* * * * *